US008983826B2

(12) United States Patent
Brdiczka et al.

(10) Patent No.: US 8,983,826 B2
(45) Date of Patent: Mar. 17, 2015

(54) METHOD AND SYSTEM FOR EXTRACTING SHADOW ENTITIES FROM EMAILS (75) Inventors: Oliver Brdiczka, Mountain View, CA (US); Petro Hizalev, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 917 days.

(21) Appl. No.: 13/173,698

(22) Filed: Jun. 30, 2011

(65) Prior Publication Data

US 2013/0006611 A1    Jan. 3, 2013

(51) Int. Cl.
*G06F 17/27* (2006.01)

(52) U.S. Cl.
CPC ........ *G06F 17/2705* (2013.01); *G06F 17/2765* (2013.01); *G06F 17/278* (2013.01)
USPC ................................ 704/9; 704/257; 715/256

(58) Field of Classification Search
CPC ......... G06F 17/20; G06F 17/21; G06F 17/27; G06F 17/2705; G06F 17/2715; G06F 17/2765; G06F 17/277; G06F 17/2775; G06F 17/278; G06F 17/2785; G06F 17/30
USPC ...................................................... 704/9, 257
See application file for complete search history.

(56) References Cited

U.S. PATENT DOCUMENTS

| | | | | |
|---|---|---|---|---|
| 6,311,152 | B1 * | 10/2001 | Bai et al. ............................ | 704/9 |
| 6,470,307 | B1 * | 10/2002 | Turney ................................ | 704/9 |
| 7,299,180 | B2 * | 11/2007 | Wang et al. ..................... | 704/257 |
| 7,376,893 | B2 * | 5/2008 | Chen et al. ...................... | 715/254 |
| 7,917,522 | B1 * | 3/2011 | Raffill et al. .................... | 707/754 |
| 8,135,728 | B2 * | 3/2012 | Yih et al. ........................ | 707/765 |
| 8,299,737 | B2 * | 10/2012 | Morita et al. ............. | 318/400.27 |
| 8,370,361 | B2 * | 2/2013 | Topham et al. ................ | 707/738 |
| 2006/0047500 | A1 * | 3/2006 | Humphreys et al. .............. | 704/9 |
| 2007/0016863 | A1 * | 1/2007 | Qu et al. ........................ | 715/702 |
| 2007/0067280 | A1 * | 3/2007 | Zhou et al. ........................ | 707/5 |
| 2009/0119235 | A1 * | 5/2009 | Kanungo et al. ................ | 706/12 |
| 2010/0030798 | A1 * | 2/2010 | Kumar et al. ................. | 707/102 |
| 2010/0145678 | A1 | 6/2010 | Csomai | |
| 2010/0223276 | A1 | 9/2010 | Al-Shameri | |
| 2011/0078098 | A1 * | 3/2011 | Lapir et al. ...................... | 706/12 |
| 2011/0231387 | A1 * | 9/2011 | Jain et al. ....................... | 707/709 |
| 2012/0117092 | A1 * | 5/2012 | Stankiewicz et al. ......... | 707/755 |

OTHER PUBLICATIONS

William J. Black and Argyrios Vasilakopoulos. 2002. Language independent named entity classification by modified transformation-based learning and by decision tree induction. In proceedings of the 6th conference on Natural language learning—vol. 20 (COLING-02), vol. 20. Association for Computational Linguistics, Stroudsburg, PA, USA, 1-4.*

(Continued)

*Primary Examiner* — Paras D Shah
(74) *Attorney, Agent, or Firm* — Shun Yao; Park, Vaughan, Fleming & Dowler LLP (57) ABSTRACT

One embodiment provides a system for extracting shadow entities from emails. During operation, the system receives a number of document corpora. The system then calculates word-collocation statistics associated with different n-gram sizes for the document corpora. Next, the system receives an email and identifies shadow entities in the email based on the calculated word-collocation statistics for the document corpora.

21 Claims, 4 Drawing Sheets

(56) References Cited

OTHER PUBLICATIONS

Zhang, Le, et al. "A statistical approach to extract chinese chunk candidates from large corpora." Proceeding of 20th International Conference on Computer Processing of Oriental Languages (ICCPOL03). 2003.*

Kwak, Byung-Kwan, et al. "Corpus-based learning of compound noun indexing." Proceedings of the ACL-2000 workshop on Recent advances in natural language processing and information retrieval: held in conjunction with the 38th Annual Meeting of the Association for Computational Linguistics—vol. 11. Association for Computational Linguistics, 2000.*

Pedersen, Ted, and Anagha Kulkarni. "Unsupervised discrimination of person names in web contexts." Computational Linguistics and Intelligent Text Processing. Springer Berlin Heidelberg, 2007. 299-310.*

Nadeau, David "Semi-Supervised Named Entity Recognition: Learning to Recognize 100 Entity Types with Little Supervision", Ottawa-Carleton Institute for Computer Science, Ottawa, Canada, 2007.

Thanopoulos, Aristomenis et al., "Comparative Evaluation of Collocation Extraction Metrics", pp. 620-625, 2002.

* cited by examiner

METHOD AND SYSTEM FOR EXTRACTING SHADOW ENTITIES FROM EMAILS

BACKGROUND

1. Field

This disclosure is generally related to analysis of document similarities. More specifically, this disclosure is related to identifying similar documents based on meaningful entities extracted from the documents as well as user input.

2. Related Art

Modern workers often deal with large numbers of documents; some are self-authored, some are received from colleagues via email, and some are downloaded from websites. Many documents are often related to one another since a user may modify an existing document to generate a new document. For example, a worker may generate an annual report by combining a number of previously generated monthly reports. When email users correspond back-and-forth to each other discussing a related topic, email messages often share similar words or combinations of words. For example, conversations discussing local weather may all include words like "rain," "snow," or "wind."

Therefore, some document-similarity calculation methods rely on the comparison of the occurrences of meaningful words that are defined as "entities" in order to derive similarities between messages or conversations. Other methods estimate document similarity by detecting a sequence of operations performed when the document is generated. However, such approaches do not consider possible comparison between documents based on different document-similarity calculation methods. Furthermore, the density of entities is often not sufficiently high for reliable similarity calculations based on semantic entities.

SUMMARY

One embodiment provides a system for extracting shadow entities from emails. During operation, the system receives a number of document corpora. The system then calculates word-collocation statistics associated with different n-gram sizes for the document corpora. Next, the system receives an email and identifies shadow entities in the email based on the calculated word-collocation statistics for the document corpora.

In a variation of this embodiment, the document corpora comprise at least one of: a personal email repository, a group email repository, a company email repository, and an online document collection or repository such as Wikipedia.

In a variation of this embodiment, the word-collocation statistics comprise at least one of: a mutual dependency (MD) value, a point-wise mutual information (PMI) value, and a log-frequency biased mutual dependency (LFMD) value.

In a variation of this embodiment, shadow entities comprise: a word with special capitalization other than first letter, a foreign language word not found in an English dictionary, an n-gram with specific values of MD, PMI, and/or LFMD, an n-gram with a specific pattern of capitalization, an n-gram with specific stop words inside, and an n-gram with specific encyclopedia terms inside.

In a variation of this embodiment, in identifying shadow entities in the email, the system first performs part-of-speech (POS) tagging in the email. The system then isolates noun phrases by chunking the POS tags. Next, the system identifies single foreign words or words having special capitalizations. The system also filters the noun phrases based on the calculated word-collocation statistics of different n-gram sizes for the document corpora.

In a further variation, the system filters the shadow entities by determining a filtering threshold of MD, PMI, or LFMD value based on the average MD, PMI, or LFMD value of the noun phrases in the email against the MD, PMI, or LFMD value for the document corpora.

In a further variation, the filtering of the noun phrases is further based on one or more of: capitalization patterns, stop word occurrences, surrounding POS tags, and encyclopedia terms.

In a further variation, the filtering of the noun phrases comprises by implementing a decision tree.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of extracting more entities than just named entities from emails and documents. During operation, the system receives a number of document corpora and calculates word-collocation statistics associated with different n-gram sizes for the document corpora. Next, the system receives an email and identifies shadow entities in the email based on the calculated word-collocation statistics from the document corpora.

Shadow Entities

Conventional named-entity recognition (NER) systems classify atomic elements or named entities in texts into predefined categories, such as people's names, organizations, and locations. Most NER systems are further optimized for recognizing and locating a subset of these categories of named entities from documents with high confidence. However, for certain applications, particularly applications for calculating document relevance and similarity, the limitation on recognizing only predefined categories of named entities often results in extractions of an insufficient number of entities for similarity calculations. In addition, newly emerging entities such as internal project names, or new product names, prove difficult to spot with the conventional NER systems.

Embodiments of the present invention provide an innovative method for identifying and extracting so-called "shadow entities" to overcome the limitation of conventional NER approaches. The additional shadow entities identified and extracted increase the entity density in documents, thus improving the accuracy of document-similarity calculations.

A shadow entity can be any textual n-gram which includes the following word or word sequence:

when n=1:

Term with specific capitalization occurring frequently (e.g., iMesh); and

Foreign language word not included in English dictionary (e.g., nepomuk).

when n≥2:

Terms with specific capitalization patterns (e.g., World of Warcraft);

Terms containing a specific occurrence of stop words (e.g., United States of America);

Terms containing specific encyclopedia terms (e.g., machinelearning approach); and Terms with specific values of word-collocation metrics.

The word-collocation metrics calculated for a document corpus include: mutual dependency (MD), point-wise mutual information (PMI), and log-frequency biased MD (LFMD). The word-collocation metrics for bi-gram are defined as:

$$PMI: I(w_1, w_2) = \log_2 \frac{P(w_1, w_2)}{P(w_1) \cdot P(w_2)},$$

$$MD: D(w_1, w_2) = I(w_1, w_2) - I(w_1 w_2) = \log_2 \frac{P^2(w_1 w_2)}{P(w_1) \cdot P(w_2)}, \text{ and}$$

$$LFMD: D_{LF}(w_1, w_2) = D(w_1, w_2) + \log_2 P(w_1 w_2) = \log_2 \frac{P^3(w_1 w_2)}{P(w_1) \cdot P(w_2)},$$

where $P(w)$ represents the probability of occurrence for word $w$, and $P(w_1 w_2)$ represents the probability of co-occurrence for bi-gram $w_1 w_2$ in the document corpus.

These word-collocation statistics can be extended to n-gram (n≥2) as shown in the following formulas:

$$PMI: I(w_1, \ldots, w_n) = \log_2 \frac{P(w_1 \ldots w_n)}{\frac{1}{n-1} \sum_{i=1}^{n-1} P(w_1 \ldots w_i) \cdot P(w_{i+1} \ldots w_n)}$$

$$= \log_2 \frac{(n-1) \cdot c(w_1 \ldots w_n) \cdot c(total_n)}{\sum_{i=1}^{n-1} c(w_1 \ldots w_i) \cdot c(w_{i+1} \ldots w_n)},$$

$$MD: D(w_1, \ldots, w_n) = I(w_1, \ldots, w_n) - I(w_1 \ldots w_n)$$

$$= \log_2 \frac{P^2(w_1 \ldots w_n)}{\frac{1}{n-1} \sum_{i=1}^{n-1} P(w_1 \ldots w_i) \cdot P(w_{i+1} \ldots w_n)}$$

$$= \log_2 \frac{(n-1) \cdot c(w_1 \ldots w_n)^2}{\sum_{i=1}^{n-1} c(w_1 \ldots w_n) \cdot c(w_{i+1} \ldots w_n)},$$

and $$LFMD: D_{LF}(w_1, \ldots, w_n) = D(w_1, \ldots, w_n) + \log_2 P(w_1 \ldots w_n)$$

$$= \log_2 \frac{P^3(w_1 \ldots w_n)}{\frac{1}{n-1} \sum_{i=1}^{n-1} P(w_1 \ldots w_i) \cdot P(w_{i+1} \ldots w_n)}$$

$$= \log_2 \frac{(n-1) \cdot \frac{c(w_1 \ldots w_n)^3}{c(total_n)}}{\sum_{i=1}^{n-1} c(w_1 \ldots w_i) \cdot c(w_{i+1} \ldots w_n)},$$

where $P(w_1 \ldots w_n)$ represents the probability of co-occurrence for n-gram $w_1 \ldots w_n$; $c(w_1 \ldots w_n)$ represents the count of occurrences of n-gram $w_1 \ldots w_n$; and $c(total_n)$ represents the total count of occurrences of all the n-grams with length n in the document corpus. Note that MD does not depend on the total count of the n-gram occurrences, which makes it particularly suitable for working with smaller corpora.

The system for extracting shadow entities receives a variety of document corpora and calculates word-collocation statistics exhaustively for learning purposes. The goal is to compute reference MD, PMI, and LFMD values for word combinations found in each corpus with different n-gram sizes, where n varies from two to eight. The resulting word-collocation statistics from different document corpora are compared to identify distinct shadow entities meaningful to each corpus. For example, a shadow entity may appear in a personal email, but not be present inside an encyclopedia index. The document corpora used for calculating the n-gram statistics may include:

personal email repository: the occurrence of certain n-grams only inside the user's emails may suggest special meanings of these n-grams to the user (e.g., stand-up meeting);

group/company email repository: the occurrence of certain n-grams inside the emails of a group or a company may suggest their group/company-wide meanings; and encyclopedia: encyclopedia indexes may help to determine which n-grams correspond to general terms or notions (e.g., machine learning).

Identifying Shadow Entities

Figure 1:
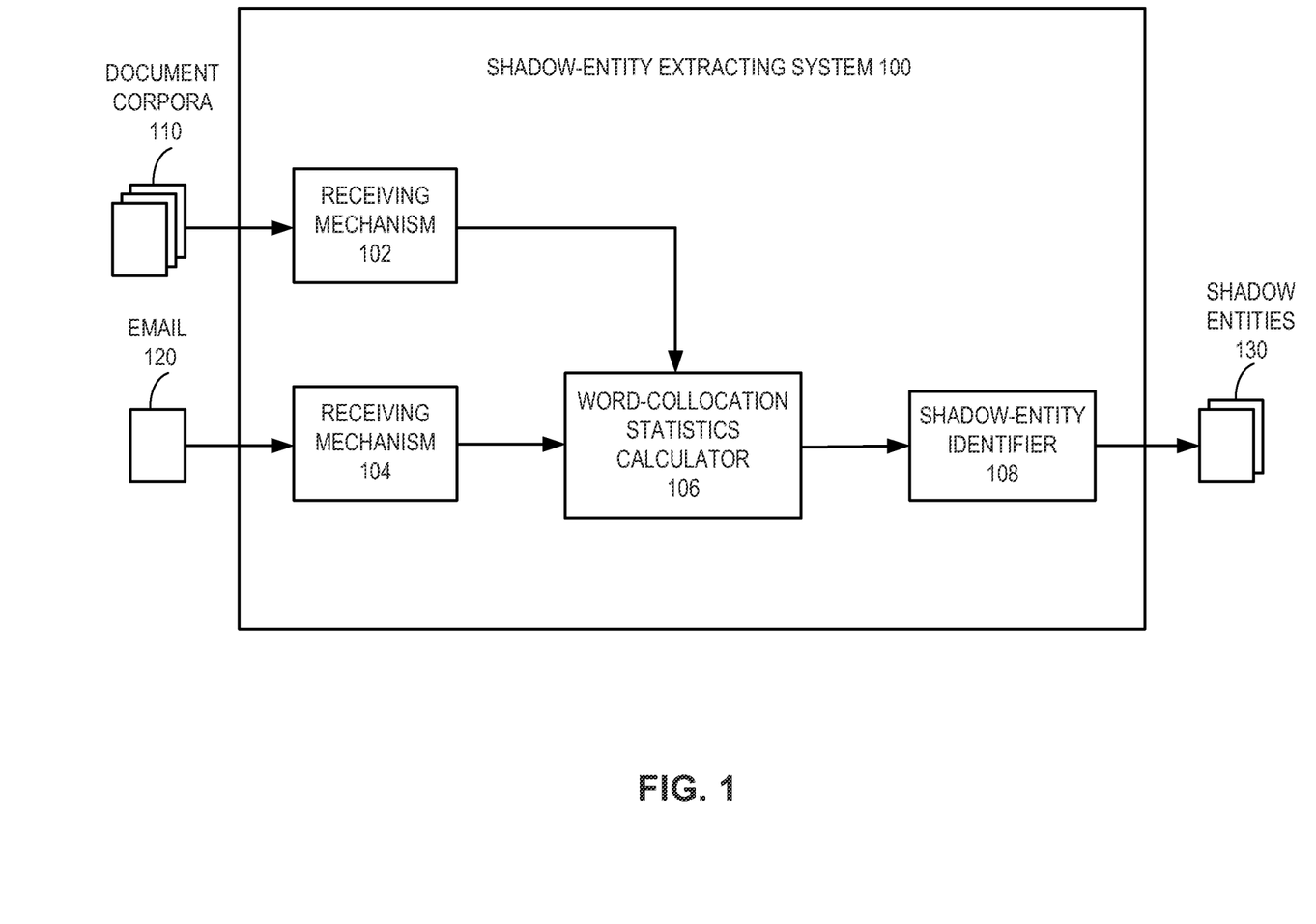
FIG. 1 presents a diagram illustrating a shadow-entity extracting system in accordance with an embodiment of the present invention.

FIG. 1 presents a diagram illustrating a shadow-entity extracting system in accordance with an embodiment of the present invention. Shadow-entity extracting system 100 includes two receiving mechanisms 102 and 104, a word-collocation statistics calculator 106, and a shadow-entity identifier 108. During operation, receiving mechanism 102 receives as input document corpora 110 for learning word-collocation statistics. Document corpora 110 may comprise personal, group, and company email repositories. Documents 110 can also include encyclopedia indexes that help determine n-grams corresponding to general terms or notions.

The received document corpora are then sent to word-collocation statistics calculator 106, which calculates the word-collocation metrics, such as MD, PMI, and LFMD, for each document corpus. In one embodiment, word-collocation statistics calculator 106 computes reference MD, PMI, and LFMD values for different n-gram sizes ranging from two to eight. Next, receiving mechanism 104 receives an email 120 from which to extract shadow entities. Email 120 is first sent to word-collocation statistics calculator 106 to calculate the word-collocation metrics, and then is passed to shadow-entity identifier 108 to extract shadow entities 130.

Figure 2:
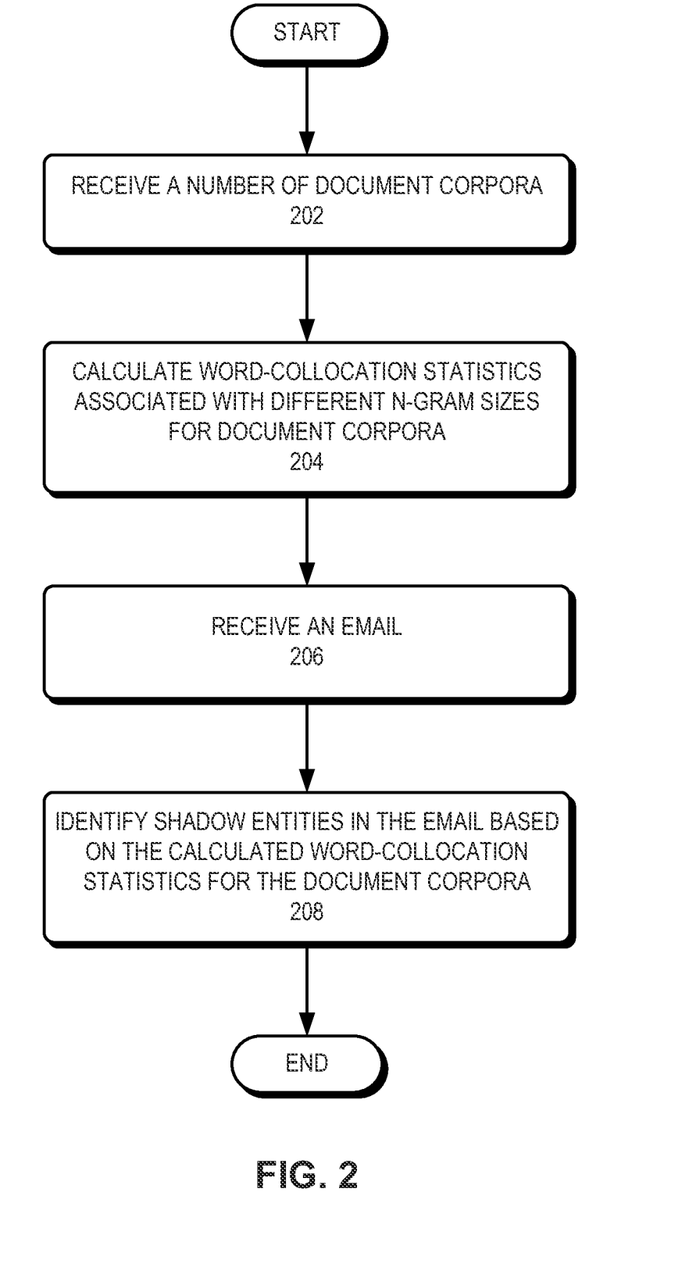
FIG. 2 presents a flowchart illustrating the process of extracting shadow entities in accordance with an embodiment of the present invention.

FIG. 2 presents a flowchart illustrating the process of extracting shadow entities in accordance with an embodiment of the present invention. During operation, the system receives a number of document corpora (operation 202). The system then calculates word-collocation statistics associated with different n-gram sizes for the document corpora (operation 204). Next, after receiving an email (operation 206), the system identifies shadow entities in the email based on the calculated word-collocation statistics for the document corpora (operation 208).

After exhaustive computation of the word-collocation statistics for the document corpora, the system performs a multi-stage filtering process in order to identify and extract shadow entities from the email. Each stage of the process reduces the number of words or word combinations to be considered as candidate shadow entities. The multi-stage filtering process starts by part-of-speech (POS) tagging, which associates all the words and word combinations in the email with POS tags. The POS tagging can be achieved, for example, using a maximum-entropy classifier trained on a POS corpus. The next step in the multi-stage filtering process involves chunking of the email with a simple regular expression or rule set to isolate potential noun-phrases (NP) from the POS tags in the email. An example of the regular expression takes the form of (\\s [CDJNP]\\w*\\$*)+ to filter POS tags or POS tag combinations starting with capital letters among C, D, J, N, and P. Since recall is favored over precision of NP detection at this stage of the process, trained models, such as HMM or maximum entropy, are not used, because they may reduce the number of shadow-entity candidates too much. An additional cleaning step can be taken to remove determiners and personal pronouns from the isolated NPs.

Next, single words that have been isolated as NPs in the previous stage can be further filtered by the fact that they are either foreign-language words, or they contain special capitalizations. To verify that the email is in English, a ratio is evaluated between the number of words in the email that are found in an English dictionary and the total number of words in the email. If the ratio exceeds a certain threshold, the email is assumed to be in English. Therefore, NPs that are not found in the English dictionary can be retained as candidates of shadow entities. Single words that contain special capitalization inside (e.g., iPhone) can also be isolated from the email if the frequency of their occurrence is above a threshold among the document corpora.

For each NP that is an n-gram (n≥2), word-collocation metrics such as MD, PMI and LFMD values are retrieved from the calculated n-gram statistics for the document corpora. A local threshold is then employed to determine whether the NP should be retained as a shadow entity. The local threshold can be adjusted based on the average MD, PMI and LFMD values associated with the email. Candidacy for the shadow entities can also be decided based on the order of the occurring frequencies; for instance, the top 10 valued NPs are retained as candidates. Furthermore, word-collocation statistics from different document corpora may be compared to identify distinct shadow entities meaningful to each corpus.

The multi-stage filtering process can apply additional filtering rules to increase the overall scores of shadow-entity candidates. These rules can be based on capitalization patterns, stop word occurrences, surrounding POS tags, and/or encyclopedia terms. Candidates with the highest final scores are extracted as shadow entities.

One embodiment of the present invention optionally applies a named entity classifier to the identified shadow entities. The named entity classifier can be trained to associate categories with the shadow entities using an encyclopedia corpus. This process is independent of the shadow-entity extraction, and does not affect shadow entities already identified. Favored classifiers include probabilistic models, such as maximum entropy and Bayes' model, which derive a probability distribution of all categories associated with a shadow entity. The shadow entity is labeled with the category with the highest probability if the probability exceeds a threshold; otherwise, the category label of the shadow entity can be left blank.

Figure 3:
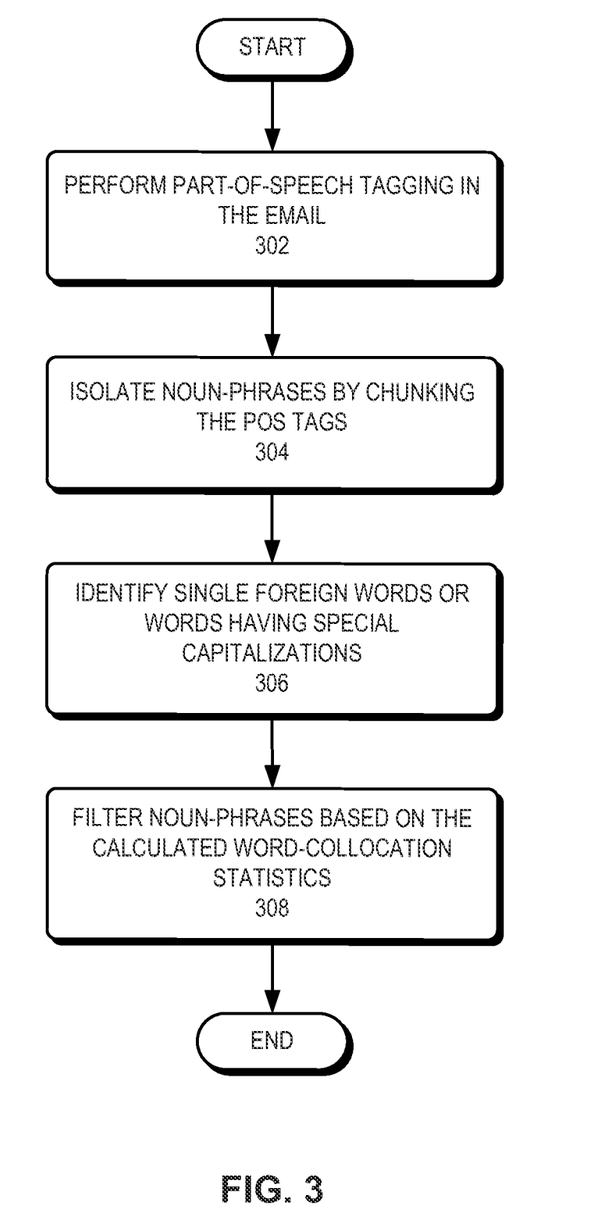
FIG. 3 presents a flowchart illustrating the process of identifying shadow entities in an email in accordance with an embodiment of the present invention.

FIG. 3 presents a flowchart illustrating the process of identifying shadow entities in an email in accordance with an embodiment of the present invention. During operation, the system performs part-of-speech tagging in the email (operation 302). Next, the system isolates noun phrases by chunking the POS tags (operation 304). The system then identifies single foreign words or words with special capitalizations (operation 306). Subsequently, the system filters noun phrases based on the calculated word-collocation statistics (operation 308).

Calculating MD, PMI and LFMD values for all the words and word combinations in a training corpus demands enormous computing power and huge storage space. A good choice is taking the task to a cloud infrastructure with distributed machines and storage devices and implementing the word-collocation metrics calculations on a map-reduce calculation framework. However, the challenge is to maintain the privacy and confidentiality of the private or corporate data sets when uploading them into the cloud infrastructure. A potential solution lies in a word hashing technique: a unique hash is first calculated for each word with a hash function chosen to minimize collisions for textual data sets. The hashes for the words in the corpus are then uploaded into the cloud infrastructure. In order to perform the above multi-stage processing, additional information is needed to indicate special capitalization patterns, stop words and encyclopedia terms, and surrounding POS tags for the different words. Additional bits encoding this additional information and associated with each hash can be used for this purpose.

Filtering shadow-entity candidates can be effectively implemented with decision trees adapted to different filtering rules, such as capitalization patterns or stop word inclusion. Instead of simple scoring, decision trees can learn a more sophisticated rule set from training data. The training data may include a number of positive and negative examples of shadow entities with different features. A decision tree can also be trained to respond to specific extraction needs, e.g., for high recall rate, or for better precision.

Exemplary Computer System

Figure 4:
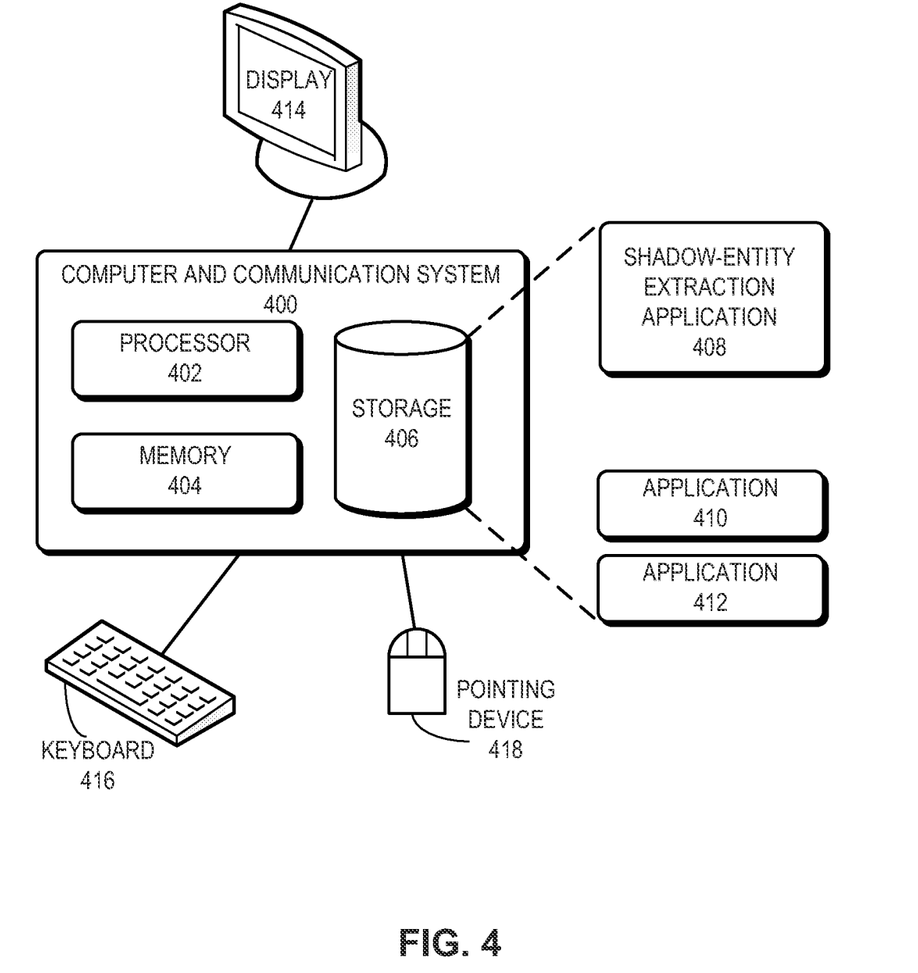
FIG. 4 illustrates an exemplary computer system for extracting shadow entities from emails in accordance with one embodiment of the present invention.

FIG. 4 illustrates an exemplary computer system for extracting shadow entities from emails in accordance with one embodiment of the present invention. In one embodiment, a computer and communication system 400 includes a processor 402, a memory 404, and a storage device 406. Storage device 406 stores a shadow-entity extraction application 408, as well as other applications, such as applications 410 and 412. During operation, shadow-entity extraction application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for extracting shadow entities from emails, the method comprising:
   loading, by a computing device, a shadow-entity extraction application from storage into memory;
   executing, by the computing device, the shadow-entity extraction application to perform:
   receiving a number of document corpora;
   calculating word-collocation statistics associated with different n-gram sizes for the document corpora;
   receiving an email;
   identifying noun phrases in the email;
   filtering the noun phrases in the email based on the calculated word-collocation statistics of different n-gram sizes for the document corpora, wherein filtering the noun phrases comprises determining a filtering threshold of mutual dependency (MD), point-wise mutual information (PMI), or log-frequency biased mutual dependency (LFMD) value based on an average MD, PMI, or LFMD value of the noun phrases in the email against the MD, PMI, or LFMD value for the document corpora; and
   identifying shadow entities in the email, based on the calculated word-collocation statistics for the document corpora and the filtered noun phrases in the email.

2. The method of claim 1, wherein the document corpora comprise at least one of:
   a personal email repository;
   a group email repository;
   a company email repository; and
   an online document collection or repository.

3. The method of claim 1, wherein the word-collocation statistics comprise at least one of:
   a mutual dependency (MD) value;
   a point-wise mutual information (PMI) value; and
   a log-frequency biased mutual dependency (LFMD) value.

4. The method of claim 1, wherein shadow entities comprise:
   a word with special capitalization other than first letter;
   a foreign language word not found in an English dictionary;
   an n-gram with specific values of MD, PMI, and/or LFMD;
   an n-gram with a specific pattern of capitalization;
   an n-gram with specific stop words inside; and
   an n-gram with specific encyclopedia terms inside.

5. The method of claim 1, wherein filtering the noun phrases is further based on one or more of:
   capitalization patterns;
   stop word occurrences;
   surrounding POS tags; and
   encyclopedia terms.

6. The method of claim 1, wherein filtering the noun phrases comprises implementing a decision tree.

7. The method of claim 1, wherein identifying shadow entities in the email comprises one or more of:
   performing part-of-speech (POS) tagging in the email;
   isolating noun phrases by chunking the POS tags; and
   identifying single foreign words or words having special capitalizations.

8. A system for extracting shadow entities from emails, comprising:
   one or more processors;
   a computer-readable medium coupled to the one or more processors having instructions stored thereon that are part of a shadow-entity extraction application loaded by a computing device from the non-transitory computer-readable storage medium into memory, and when the instructions are executed by the one or more processors, cause the one or more processors to perform operations comprising:
   receiving a number of document corpora;
   calculating word-collocation statistics associated with different n-gram sizes for the document corpora;
   receiving an email;
   identifying noun phrases in the email;
   filtering the noun phrases in the email based on the calculated word-collocation statistics of different n-gram sizes for the document corpora, wherein filtering the noun phrases comprises determining a filtering threshold of mutual dependency (MD), point-wise mutual information (PMI), or log-frequency biased mutual dependency (LFMD) value based on an average MD, PMI, or LFMD value of the noun phrases in the email against the MD, PMI, or LFMD value for the document corpora; and
   identifying shadow entities in the email based on the calculated word-collocation statistics for the document corpora and the filtered noun phrases in the email.

9. The system of claim 8, wherein the document corpora comprise at least one of:
   a personal email repository;
   a group email repository;
   a company email repository; and
   an online document collection or repository.

10. The system of claim 8, wherein the word-collocation statistics comprise at least one of:
    a mutual dependency (MD) value;
    a point-wise mutual information (PMI) value; and
    a log-frequency biased mutual dependency (LFMD) value.

11. The system of claim 8, wherein shadow entities comprise:
    a word with special capitalization other than first letter;
    a foreign language word not found in an English dictionary;
    an n-gram with specific values of MD, PMI, and/or LFMD;

an n-gram with specific pattern of capitalization;
an n-gram with specific stop words inside; and
an n-gram with specific encyclopedia terms inside.

12. The system of claim 8, wherein the entity-identification mechanism is further configured to filter the noun phrases based on one or more of:
   capitalization patterns;
   stop word occurrences;
   surrounding POS tags; and
   encyclopedia terms.

13. The system of claim 8, wherein while filtering the shadow entities, the entity-identification mechanism is further configured to implement a decision tree.

14. The system of claim 8, wherein identifying shadow entities in the email comprises one or more of:
   perform part-of-speech (POS) tagging in the email;
   isolate noun phrases by chunking the POS tags; and
   identify single foreign words or words having special capitalizations.

15. A non-transitory computer-readable storage medium storing instructions that are part of a shadow-entity extraction application loaded by a computing device from the non-transitory computer-readable storage medium into memory, and when the instructions are executed by a computer cause the computer to perform a method for extracting shadow entities from emails, the method comprising:
   receiving a number of document corpora;
   calculating word-collocation statistics associated with different n-gram sizes for the document corpora;
   receiving an email;
   identifying noun phrases in the email;
   filtering the noun phrases in the email based on the calculated word-collocation statistics of different n-gram sizes for the document corpora, wherein filtering the noun phrases comprises determining a filtering threshold of mutual dependency (MD), point-wise mutual information (PMI), or log-frequency biased mutual dependency (LFMD) value based on an average MD, PMI, or LFMD value of the noun phrases in the email against the MD, PMI, or LFMD value for the document corpora; and
   identifying shadow entities in the email based on the calculated word-collocation statistics for the document corpora and the filtered noun phrases in the email.

16. The non-transitory computer-readable storage medium of claim 15, wherein the document corpora comprise at least one of:
   a personal email repository;
   a group email repository;
   a company email repository; and
   an online document collection or repository.

17. The non-transitory computer-readable storage medium of claim 15, wherein the word-collocation statistics comprise at least one of:
   a mutual dependency (MD) value;
   a point-wise mutual information (PMI) value; and
   a log-frequency biased mutual dependency (LFMD) value.

18. The non-transitory computer-readable storage medium of claim 15, wherein shadow entities comprise:
   a word with special capitalization other than first letter;
   a foreign language word not found in an English dictionary;
   an n-gram with specific values of MD, PMI, and/or LFMD;
   an n-gram with a specific pattern of capitalization;
   an n-gram with specific stop words inside; and
   an n-gram with specific encyclopedia terms inside.

19. The non-transitory computer-readable storage medium of claim 15, wherein filtering the noun phrases is further based on one or more of:
   capitalization patterns;
   stop word occurrences;
   surrounding POS tags; and
   encyclopedia terms.

20. The non-transitory computer-readable storage medium of claim 15, wherein filtering the noun phrases comprises implementing a decision tree.

21. The non-transitory computer-readable storage medium of claim 15, wherein identifying shadow entities in the email comprises one or more of:
   performing part-of-speech (POS) tagging in the email;
   isolating noun phrases by chunking the POS tags; and
   identifying single foreign words or words having special capitalizations.

\* \* \* \* \*